May 14, 1935. A. NYMAN 2,001,282
ELECTRICAL DEVICE
Original Filed Oct. 1, 1925
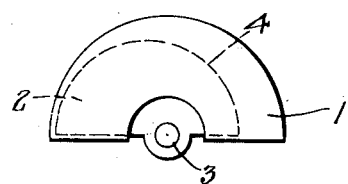
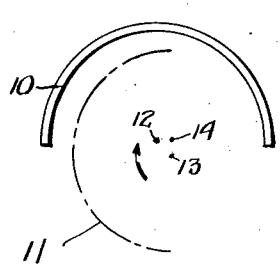
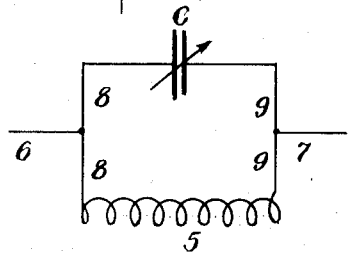
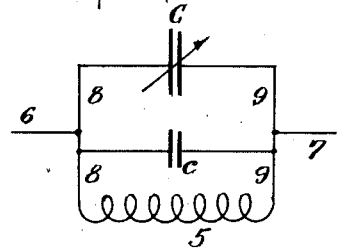
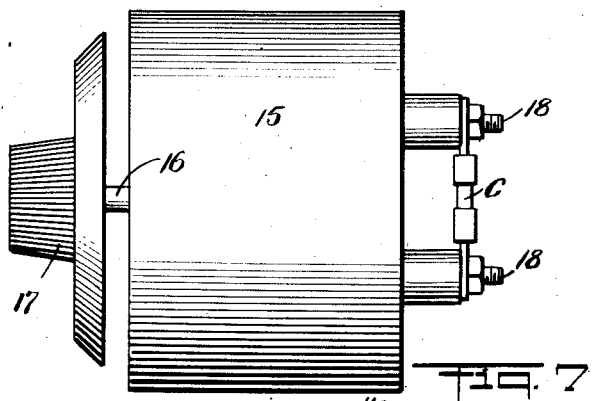
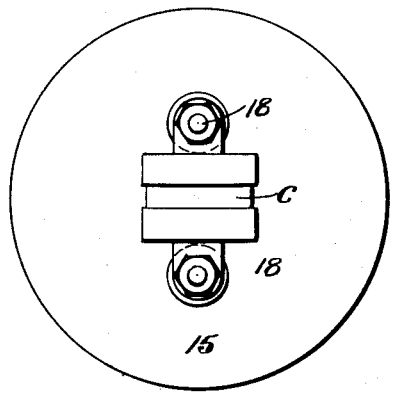
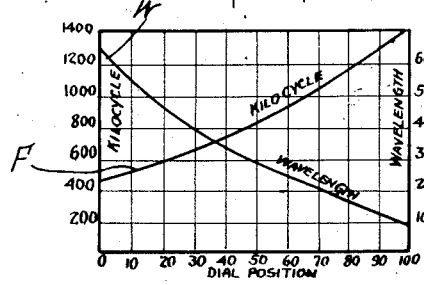
INVENTOR
ALEXANDER NYMAN
BY
Van Deventer + Nickel
ATTORNEYS Patented May 14, 1935

2,001,282

UNITED STATES PATENT OFFICE 2,001,282

ELECTRICAL DEVICE

Alexander Nyman, Dobbs Ferry, N. Y., assignor to Dubilier Condenser Corporation, New York, N. Y., a corporation of Delaware Application October 1, 1925, Serial No. 59,876
Renewed April 20, 1932

9 Claims. (Cl. 175—41.5)

This invention relates to electrical devices, especially electrical condensers for radio and other electrical apparatus.

An object of this invention is to provide a condenser adapted for electrical oscillations of relatively high frequency; the condenser comprising fixed and movable parts, the latter of such design that the condenser can be suitably connected and adjusted to give a variation of wave length or frequency approximately in proportion to the amount of displacement of such movable parts.

Further objects and advantages of this invention will appear from the following description taken with the drawing; and the novel features are pointed out in the appended claims. But the disclosure is of course illustrative only, and I may vary the details of the several embodiments of my invention actually shown herein without departing from the principle of the invention, or exceeding the scope or meaning of the terms in which the claims are expressed.

On the drawing:—

Figure 1 is a more or less diagrammatic view, in front elevation of a variable condenser used in the practice of my invention;

Figure 2 is a view of another form of such a condenser;

Figures 3 and 4 illustrate circuits including such condensers, connected to give the result desired;

Figure 5 is a side view, and

Figure 6 an end of a variable condenser used in the practice of my invention, operatively combined with a small condenser of constant capacity; and Figure 7 is a chart to show the results of the mode of operation.

The same numerals identify the same parts throughout.

In Figure 1 the numeral 1 indicates a fixed or stationary conductor plate, supported in any convenient manner, this plate to be connected to one terminal of the circuit in which the condenser is to be used. In shape this plate may be spiral or semi-circular, and there may be one or more than one in any number desired. To cooperate with the plate or plates 1, I mount in proximity thereto a corresponding number of plates 2, all affixed to a rotatable shaft or axis 3. These plates 2 can therefore be moved with respect to the plates 1. The fixed plates and the movable plates are of course disposed in alternation, and the plates 2 are connected to the opposite terminal of the circuit. The plate 2 is also shown as approximately spiral, and when the straight edges of the plates 1 and 2 coincide, as indicated in Figure 1, the capacity of the condenser is of course at its maximum because the maximum areas of the fixed and movable plates are then in overlying position. As the shaft 3 is turned anti-clockwise for example, the capacity is decreased. I prefer to make the plate or plates 2 such that the curved edge 4 has the form of a linear spiral, which can be expressed by the equation $r = a + bx$; $r$ being the radius of curvature, $a$ and $b$, constants, and $x$ the angle through which $r$ revolves, the center of revolution being the axis of the shaft 3.

The shape of the plates 1 and 2 is thus chosen that the capacity of the condenser when properly connected can be varied to give a change of wave length that is substantially in direct proportion to the angle of movement through which the shaft 3 carrying one or more plates 2 is rotated. For example, to adjust for a wave length halfway between minimum and maximum, the shaft is moved through only 90 degrees from the position of minimum capacity, instead of 180 degrees therefrom to the position shown in Figure 1.

In Figure 3, the diagram of connections for the circuit is presented. The variable condenser is indicated at C, and it is in multiple with an inductance coil 5. At 6 and 7 are shown the conductors or main leads of the circuit, and these leads are joined to the terminals of the condenser and of the inductance by the branch conductors 8 and 9. In this arrangement the wave length varies according to the angle of rotation of the shaft 3, the wave length decreasing as the shaft 3 turns to decrease capacity by moving plates 1 and 2 apart; and vice versa.

If one wishes to secure, by changing the capacity of the condenser, a variation in the frequency of the oscillations, and to make the variation in frequency substantially proportional to the angle of rotation of the member 2, a small fixed condenser $c$ is connected in parallel with the condenser of either Figure 1 or Figure 2. The circuit will then be as shown in Figure 4. Here the frequency increases as the capacity of the condenser is decreased, and vice versa.

The method of mounting the fixed condenser in place on the adjustable condenser, is shown in Figures 5 and 6. At 15 is indicated the casing enclosing the parts of the variable condenser, the shaft 16 of which, carrying the movable members, bears an operating knob 17. On the front of this casing adjacent this knob may be a graduated scale or dial. The fixed condenser c is affixed to terminals 18, protruding from the back of the casing, these terminals being joined one to the movable member and one to the fixed member or members thereof.

Figure 7 is a chart showing the variations of wave length and frequency in kilocycles proportional to the degree of movement or rotation of the member or members 2, as indicated by the scale, the positions of which are numbered at the bottom of this chart. The two curves W and F are given respectively by the circuits shown in Figure 3 and Figure 4.

Figure 2 illustrates a condenser comprising a fixed semi-cylindrical conductive member or armature 10, corresponding to the plate or member in Figure 1, and cooperating with this member 10 is a rotatable member 11 also semi-cylindrical corresponding to the plate or member 2. The center of curvature of the member 10 is shown at 12, and that of the member 11 at 13; while at 14 is the axis of rotation about which the member 11 turns. When the parts 10 and 11 are in position of maximum capacity, the points 12 and 13 will coincide. The member 10 can be supported and the member 11 mounted as before in any suitable fashion. It will be seen that as the condenser of Figure 2 is adjusted to full capacity, the distance between the two members decreases, as the overlying areas increase, and the wave length also increases. The condenser of Figure 2 can be connected like the first condenser, as shown at C in both Figure 3 and Figure 4.

Having described my invention, what I believe to be new and desire to secure and protect by Letters Patent of the United States is:—

1. The combination of a variable condenser having a fixed member and a movable member adapted to give substantially a straight line wave length relation, and a condenser of constant and relatively small capacity bridged across the terminals of the variable condenser and cooperating therewith to change the capacity relation of said members to one more closely approximating a straight line frequency relation.

2. A variable condenser comprising a fixed member and a rotatable member in cooperative relation, the said members comprising substantially semi-cylindrical elements having curvatures concentric to each other in a position of maximum overlap, the said rotatable member having a center of rotation at a point different from its center of curvature, the elements being adapted to give substantially a straight line wave length characteristic relative to angular displacement of the movable member, and a condenser having a capacity of less than twenty per cent of the maximum capacity of said variable condenser bridged across the terminals of the elements and changing the said characteristic to approximately straight line frequency relative to angular displacement of the movable member.

3. The combination of a variable condenser having a fixed member and a rotatable member which give a non-linear relation of capacity to angular displacement of the rotatable member, and a relatively small fixed condenser connected in parallel with said variable condenser, the resultant combination having a capacity variation with angular displacement of the rotatable member which more closely approximates a straight line frequency characteristic.

4. In combination, a variable condenser comprising a fixed member and a rotatable member; said rotatable member being substantially semi-circular and having a center of rotation displaced from its center of curvature to a point such that the rate of change of capacity with angular displacement of said rotatable member continually increases according to a substantially straight line wave length characteristic; and a fixed condenser connected in parallel with said variable condenser and having sufficient capacity to modify the rate of change of said variable condenser to give a substantially straight line frequency characteristic.

5. In combination, a variable condenser having a fixed plate, a rotatable plate having a curved edge which follows the form of a linear spiral, and a fixed condenser connected across said variable condenser and having sufficient capacity to give to the resultant combination a variation of frequency substantially in proportion to angular displacement of the rotatable plate.

6. In combination, a variable condenser having a fixed plate, a rotatable plate having a curved edge which follows the form expressed by the equation $r = a + bx$, and a fixed condenser connected across said variable condenser and having sufficient capacity to give to the resultant combination a variation of frequency substantially in proportion to angular displacement of the rotatable plate.

7. A condenser system comprising a variable condenser of the straight line wave length type and a relatively small fixed capacity condenser connected in parallel therewith and so arranged that the combination will result in substantially a straight line frequency relation in the variable condenser.

8. The combination of a variable condenser having a fixed member and a movable member adapted to give a change of wave length substantially in proportion to displacement of said movable member, and a condenser of constant capacity bridged across the terminals of the variable condenser to cooperate therewith and give a change of frequency substantially in proportion to the displacement of the movable member.

9. The combination of a variable condenser having a fixed member and a movable member adapted to give a substantially straight line wave length characteristic with angular displacement of the movable member, and a relatively small fixed capacity bridged across the terminals of the variable condenser and changing the said characteristic to approximately straight line frequency relative to said displacement.

ALEXANDER NYMAN.